United States Patent
Pauly et al.

(10) Patent No.: US 7,478,406 B2
(45) Date of Patent: Jan. 13, 2009

(54) DATA ACCESS METHOD FOR A CONTROL SYSTEM

(75) Inventors: Thomas Pauly, Västerås (SE); Mikael Rudin, Västerås (SE); Johan Andersson, Västerås (SE)

(73) Assignee: ABB AB, Västerås (SE)

( * ) Notice: Subject to any disclaimer, the term of this patent is extended or adjusted under 35 U.S.C. 154(b) by 409 days.

(21) Appl. No.: 10/491,282

(22) PCT Filed: Sep. 18, 2002

(86) PCT No.: PCT/SE02/01699

§ 371 (c)(1),
(2), (4) Date: Oct. 4, 2004

(87) PCT Pub. No.: WO03/032233

PCT Pub. Date: Apr. 17, 2003

(65) Prior Publication Data

US 2005/0033802 A1     Feb. 10, 2005

(30) Foreign Application Priority Data

Oct. 5, 2001     (SE)     .................................... 0103345

(51) Int. Cl.
*G06F 3/00*     (2006.01)
*G06F 9/44*     (2006.01)
*G06F 9/46*     (2006.01)
*G06F 13/00*     (2006.01)

(52) U.S. Cl. ...................... 719/319; 719/313; 709/219; 709/238

(58) Field of Classification Search ......... 719/310–320, 719/328–330; 709/201–203, 217–219, 230–238; 717/201–203, 217–219, 230–238
See application file for complete search history.

(56) References Cited

U.S. PATENT DOCUMENTS 5,038,318 A     8/1991     Roseman (Continued)

FOREIGN PATENT DOCUMENTS

WO     WO 9946651 A1     9/1999

(Continued)

OTHER PUBLICATIONS

OPC Task Force, OPC Overview—Version 1.0, Oct. 27, 1998.*

(Continued)

*Primary Examiner*—Meng-Ai An
*Assistant Examiner*—Diem K Cao
(74) *Attorney, Agent, or Firm*—Venable LLP; Eric J. Franklin (57) ABSTRACT

A method and system for a client application (1) to request a data item from an access server (3) in a computer controlled control system. The control system includes objects and a plurality of access servers, which said objects represent various entities that have a defined functional meaning in the control system. Each access server, such as an OPC server, may provide access to one or more real-time data, historical data, and alarm and event data items. In an embodiment the method provides means, which enables the Access Service Handler (2) component, by querying a said object, to obtain a reference for a desired data item, to find out which access server handles the said data item. The Access Service handler then makes request to the identified access server.

24 Claims, 7 Drawing Sheets

U.S. PATENT DOCUMENTS

| | | | |
|---|---|---|---|
| 5,764,906 A * | 6/1998 | Edelstein et al. | 709/219 |
| 5,808,911 A | 9/1998 | Tucker et al. | |
| 5,960,194 A * | 9/1999 | Choy et al. | 707/102 |
| 6,167,449 A * | 12/2000 | Arnold et al. | 709/227 |
| 6,285,966 B1 * | 9/2001 | Brown et al. | 702/188 |
| 6,571,140 B1 * | 5/2003 | Wewalaarachchi et al. | 700/83 |
| 6,658,491 B1 * | 12/2003 | Hawkinson et al. | 719/331 |
| 6,993,585 B1 * | 1/2006 | Starkovich et al. | 709/228 |
| 2002/0067370 A1 * | 6/2002 | Forney et al. | 345/742 |
| 2002/0116453 A1 * | 8/2002 | Todorov et al. | 709/203 |
| 2003/0107588 A1 * | 6/2003 | Elsbree et al. | 345/700 |
| 2003/0191677 A1 * | 10/2003 | Akkiraju et al. | 705/8 |
| 2005/0038885 A1 * | 2/2005 | Agrusa et al. | 709/223 |

FOREIGN PATENT DOCUMENTS

| | | |
|---|---|---|
| WO | WO 0002953 A1 | 1/2000 |
| WO | WO 0075901 A2 | 12/2000 |
| WO | WO 0075901 A3 | 12/2000 |
| WO | WO 0077653 A1 | 12/2000 |
| WO | WO 0213482 A1 | 2/2002 |
| WO | WO 0223364 A1 | 3/2002 |
| WO | WO 0223454 A1 | 3/2002 |

OTHER PUBLICATIONS

OPC Foundation, OPC Data Access Automation Specification, Feb. 3, 1999, pp. 1-100.*

Wollschlaeger, Intranet-based management framework for industrial communication systems, IEEE, 1999, pp. 823-830.*

Klavsutz et al, Information Systems in Demand side management, IEEE, 2000, pp. 97-102.*

Kero et al, OPC-Based WAP Solution, Tampere University of Technology Automation and Control Institute, May 29-30, 2000, pp. 1-5.*

Janke, OPC-Plug and Play Integration to Legacy Systems, IEEE, 2000, pp. 68-72.*

Lee et al, A Middleware for an Open Control System in the Distributed Computing Environment, IEEE, May 21-26, 2001, pp. 2512-2516.*

Lee et al, Middleware Architecture for Open Control Systems in the Distributed Computing Environment, ICASE, Sep. 2001, pp. 190-196.*

OPC Foundation, OPC Batch Automation Interface Specification, Jul. 19, 2001, pp. 1-22.*

M. R. Wheatleyand M. Rainford; Codas Object Monitorning Service; Fusion Engineering and Design 56-57; 2001; pp. 993-997; Elsevier, Switzerland.

David S. Platt;Building Reusable Web Components with SOAP and ASP; MSDN Magazines; 2001; Issues 01/02; Microsoft Corporation.

* cited by examiner

DATA ACCESS METHOD FOR A CONTROL SYSTEM

TECHNICAL FIELD

The present invention is concerned with providing means for uniform and location transparent access to real-time data, historical data, and alarm and event data, from different sources to software applications in a computerized system for control. A computerised system for control includes control systems as such, process control systems and manufacturing execution systems. In particular the present invention concerns a method and computer program whereby a software application can use one and the same interface to access different data sources, regardless of what and how many different mechanisms are required to provide the access.

BACKGROUND ART

Systems for control and manufacturing execution include many and different types of software applications. An example is a process graphics package, which presents data items representing the current status of a process on a screen, and allows an operator to issue control orders by inputting new values for data items. Another example is an event logging function, which stores and presents information on events and alarms. Yet another example is a history package, which collects series of data item values for long-term storage, for presentation as trend curves or in other forms, and for further processing by other applications. Yet another example is a report package, which collects certain data items, performs some calculations, and presents the result as a report.

Yet another example is a calculation package, for example a spreadsheet application, which collects samples of data item values, performs certain calculations, and potentially writes back new values to the same or different data items. Yet another example is an optimization package, which based on the values of a number of data items that describe the current performance of a process calculates new values for a number of setpoints in order to optimize the performance.

Yet another example is a production planning function, which uses information about the current production order backlog and values of data items that describe the current availability of certain processing or manufacturing equipment, to determine an optimal production schedule. Yet another example is a production report package, which uses certain data items to calculate and report the amount of products that has been produced.

For their functionality these applications and others require access to information such as real-time data, historical data, and alarm and event data from controllers and devices, and also from other software applications. However, today's control systems are heterogeneous systems, where components of different types and from different vendors, such as process controllers, programmable logic controllers (PLC), intelligent field devices, communication links, and software applications, are combined in an integrated system.

Traditionally, this has required that software applications requiring data in a control system needed to have special and different adaptations to access different sources for real-time data, historical data, and alarm and event data. This is illustrated in a simplified diagram in FIG. 1 from the Prior Art, which shows a process control system with a client application 1 and three different data sources 5A, 5B, 5C: a Programmable Logic Controller (PLC) 5A, accessed through Communication Driver A, 4A; a Process Controller 5B accessed through Communication Driver B, 4B; and a software application 5C accessed through a software interface. Other possible data sources may for example be fieldbus connected devices of different manufacture, requiring other types of communication drivers, and databases and other software applications with other types of software interfaces. The client application includes different specific adaptations 9 to allow it to communicate with the different data sources through these different communication drivers and software interfaces.

OPC (OLE for Process Control, where OLE means Object Linking and Embedding) is a specification that is aimed at eliminating some of these problems, by requiring all data sources to show the same type of interfaces. OPC is a well-known specification, published by the OPC Foundation. It is based on Microsoft's Component Object Model (COM).

Figure 1:
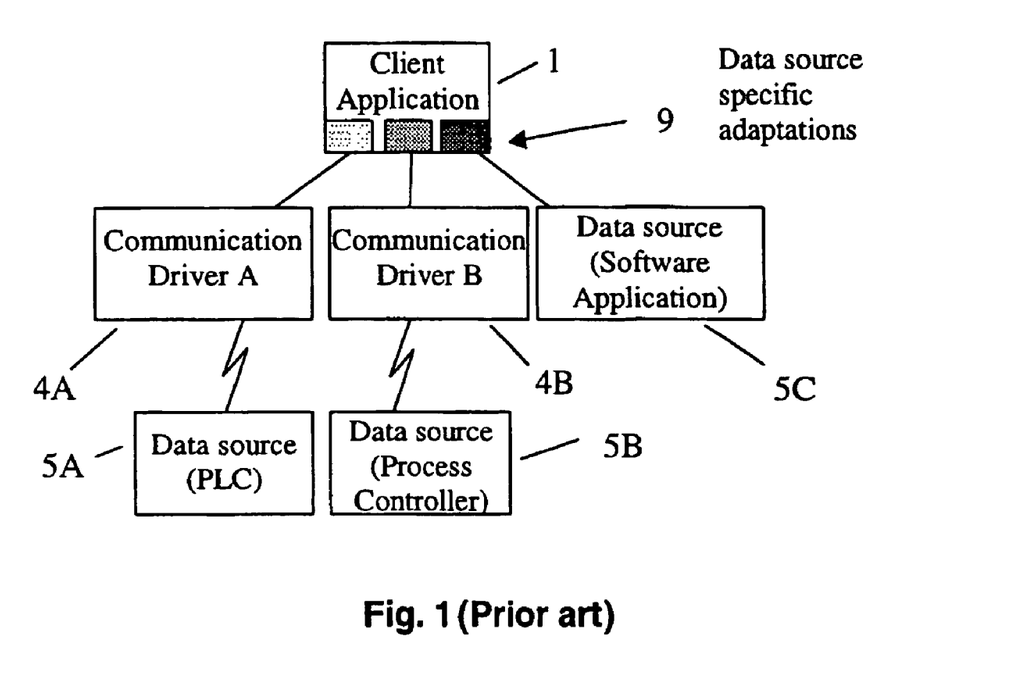
FIG. 1 (prior art) shows schematically an overview of a control system including a client application and a plurality of data sources.
Figure 2:
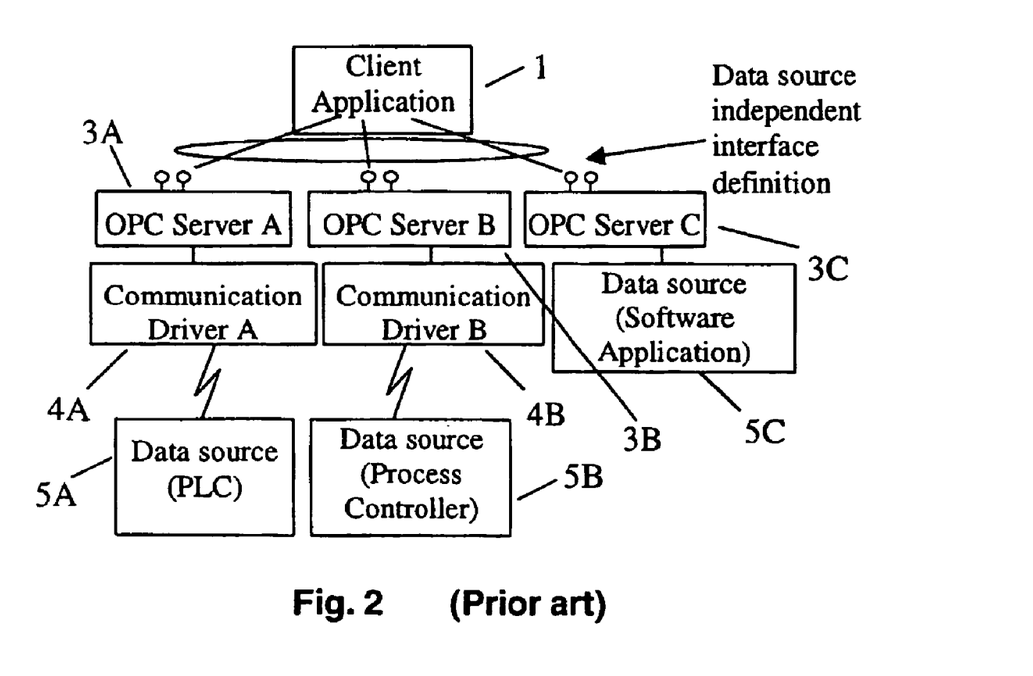
FIG. 2 (prior art) shows in a simplified way how a client application may be connected to a plurality of data sources with data-independent interfaces using OPC Servers.

FIG. 2 from the Prior Art shows a process control system with the same client application 1 and data sources 5A, 5B, 5C as shown in FIG. 1, but with an OPC Server 3A, 3B, 3C for each type of data source. All OPC servers expose the same types of interfaces, thus eliminating the need for the client application to include different data source specific adaptations.

OPC also allows a client application to access several data items with one single request as long as all data items are accessible through the same OPC server.

Although OPC relieves a client application from the need to use specific adaptations for different data sources, it still requires the client application to know which specific OPC server provides access to which data item, so that it can direct its access request to the right OPC server. For the same reason the client application can not access several data items with one single request when the data items are accessible through different OPC servers. This has the drawback that it adds complexity to the client application, which needs to keep track of which OPC server to use for each individual data item, and to generate separate access requests for access to data items that originate in different types of data sources. Another drawback is that when a new OPC server is installed in the system to provide access to a new type of data source, the client application needs to be changed to be able to use also that OPC server.

U.S. Pat. No. 5,038,318 entitled Device for communicating real time data between a programmable logic controller and a program operating in a central controller discloses a computer connected to a network of programmable logic controllers (PLCs) which could be used to perform monitoring and control functions in a context of manufacturing. The description discloses an add-in computer program operable through a general purpose spreadsheet program in a personal computer which can move real-time status and control messages directly between cells in the spreadsheet displayed on the PC and memory parts of programmable logic controllers (PLCs). This aims at facilitating a user's real-time monitoring and control of manufacturing performed at machine tools or in processing stations by means of a program that could run on a personal computer, a PC.

However, the functionality is described for a traditional network of PLCs connected via coaxial cable. The functionality describes an ability to communicate between a PLC and the PC which is limited to:

the spreadsheet application sending a message to a PLC, which message contains a predetermined specific memory register of the PLC, which message is sent to the specific PLC via a network card and a local network, for the purposes of reading or writing information to or from a specified cell in the spreadsheet program on the PC.

WO 99/46651 entitled Process control with ActiveX, discloses a software development toolkit for a user to create one or more real-time interactive control and communication software objects, for use in connection with a computer and a machine. Disclosed is the use of a type of software object developed by Microsoft Corporation called ActiveX components. WO 99/46651 discloses that prefabricated software objects of the ActiveX type may be provided by means of the described toolkit. These ActiveX software objects are also described as using OPC as a communication means between a software representation of an object for control and a control signal in a processing machine. However the key association and configuration functions of the software object described are created in advance of use, that is, before run-time. Furthermore, the software object described is limited as regards for example updates and future use or changes in use because the software object created by the toolkit is directly linked to a connection tag for an individual specified control signal.

WO00102953 entitled "Method of integrating an application in a computerized system" discloses a method for integration of many and various types of applications in a computerized system. This method is based on a concept where real world objects are represented as "composite objects". Different facets of a real world object, such as its physical location, the current stage in a process, a control function, an operator interaction, a simulation model, some documentation about the object, etc., are each described as different aspects of the composite object. A composite object is a container for one or more such aspects. Thus, a composite object is not an object in the traditional meaning of object-oriented systems, but rather a container of references to such traditional objects, which implement the different aspects. Each aspect or group of aspects may be implemented by an independent software application, which provides its functionality through a set of interfaces that are accessible through the composite object. Another software application can thus query a composite object for a function associated with one of its aspects, and as a result obtain through the composite object a reference to the interface that implements the function.

Web Services is an example of a technology that enables remote access to (software) objects by use of Internet technology. WO 0077653A1, entitled Method and apparatus for providing network services, discloses a method and apparatus for providing network services for businesses. The description discloses a method to use HTTP (Hypertext Transfer Protocol) and requests GET and POST to provide input data for a web service. The use and development of Web Services using cross-platform technologies such as XML (Extensible Markup Language), HTTP and SOAP (Simple Object Access Protocol) is described in the article "Web Services: Building Reusable Web Components with SOAP and ASP.NET", published by Microsoft Press in the February 2001 Issue of MSDN Magazine. The article is also published on the Internet at the Microsoft msdnmag web site.

SUMMARY OF THE INVENTION

The aim of the present invention is to solve one or more of the above problems. The present invention provides means for client applications to access data such as real time, historical, and event and alarm data, without the need for the client applications to know which access server to use for each data item, and to do so uniformly and transparently. A further aim of the invention is to provide a means to allow client applications to access several data items by means of one single request even when the data items are accessible through different OPC servers.

These and other aims are realised by a method, a system, and a computer program product.

The main advantage of the present invention is that software applications, and in particular client applications, can access data items such as real-time data, historical data, and alarm and event data, without need for the additional complexity of each client application to know which access server to use for each individual data item. This in turn greatly simplifies the:

functionality required in a client application,
addition of new client applications,
addition of new types of data sources, and
upgrading of the control system.

Another advantage of the invention is that client applications are relieved form the additional complexity that is required to handle situations where each access server exists in multiple instances. This may be the case when there are very large numbers of data items in a system and multiple access servers are required to share the load, or when, for example, access servers are duplicated for improved availability (redundancy).

In large and complex control systems used for supervision and control of industrial equipment and processes there are typically thousands or even hundreds of thousands of individual data items, and many different client applications that need to access them. The reduced complexity of these client applications that is made possible by the invention represents a great technical advantage with significant reductions in the cost of providing sophisticated control systems.

An advantageous development of the preferred embodiment of the invention comprises a proxy means, described as a Connector, which makes it possible to use means for the communication between client applications and access servers that are optimal for different situations. This includes the use of web technologies, such as web services and SOAP, which allow a more extensive degree of geographical distribution of client applications to be implemented economically, using low cost and readily available technology.

BRIEF DESCRIPTION OF THE DRAWINGS

A more complete understanding of the method and system of the present invention may be had by reference to the following detailed description when taken in conjunction with the accompanying drawing wherein.

DESCRIPTION OF THE PREFERRED EMBODIMENTS

A method for providing means for access to real-time data, historical data, and alarm and event data from different sources to client applications in a computerized system for control in a uniform and location transparent way according to the present invention, involves the use of software objects that represent various entities that have a defined functional meaning in the system. An example of such an entity is a flow control loop, another example is a temperature measurement, and a third example is a start-up sequence. In this description, software objects that represent such entities are called entity objects.

Other terms used in this description include that software applications that require access to data as described above are referred to as client applications, and a mechanism that provides the means for such access is called an access server. Items of real-time data, historical data, or alarm and event data, are referred to as data items.

Figure 3:
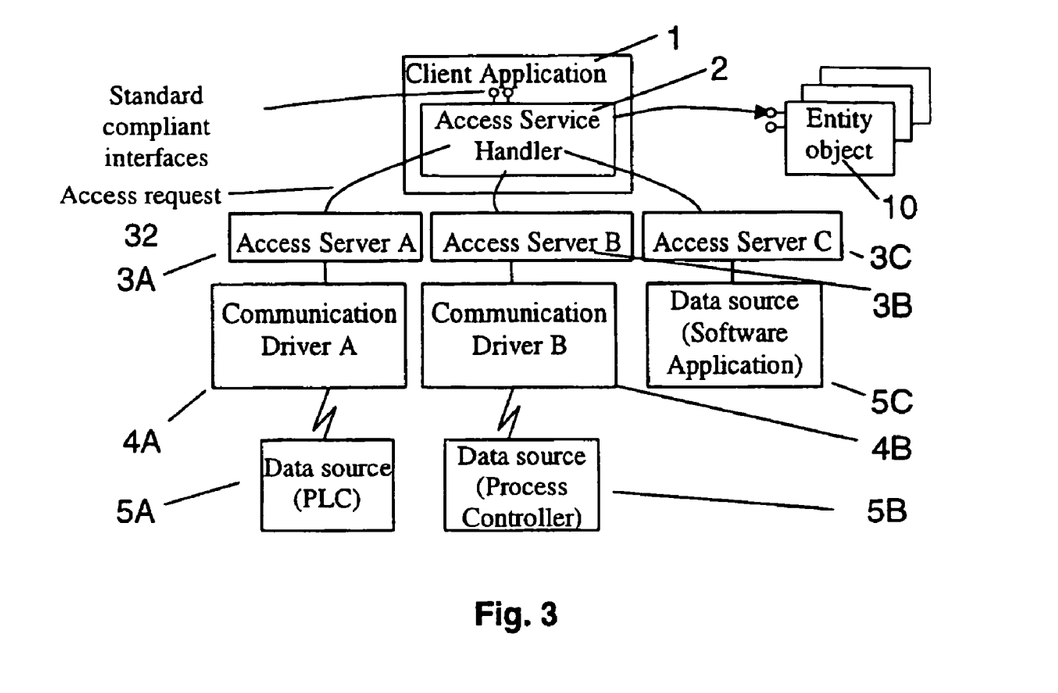
FIG. 3 shows a simplified diagram of a control system provided with a general type of access server instead of OPC servers in which control system the client application is provided with an Access Service Handler component and there are entity objects containing information about data items according to an embodiment of the invention.

FIG. 3 shows a Control System according to an embodiment of the invention including a Client Application 1, an Access Service Handler 2, and one or more Entity Objects 10. In this exemplary embodiment, it is a process control system that is shown. Also included in the process control system are three access servers 3A, 3B, 3C for three different types of data sources: a PLC 5A, a Process Controller 5B and a Software Application 5c. Lines of communication between the three access servers 3A, 3B, 3C and different data sources such as 5A, 5B, 5C are otherwise shown arranged in a similar way as that in the prior art shown in FIG. 2.

Associated with each Entity Object 10 are different data items, which hold information about the entity that the entity object represents. The Entity Object holds a reference to each associated data item, which reference includes information on how to access that data item. The data items are located in one or more data sources such as the PLC 5A, Process Controller 5B or Software Application 5C represented in FIGS. 3-8 described below. Data items may include for example real-time data, historical data, or alarm and event data. Examples of data items associated with an entity object are for a flow control loop: NAME, DESCRIPTION, VALUE, SETPOINT, GAIN, OUTPUT and STATUS.

for a temperature measurement: NAME, DESCRIPTION, VALUE, HIGH ALARM LIMIT, LOW ALARM LIMIT, and STATUS for a start-up sequence: NAME, DESCRIPTION, START, STOP, CURRENT STEP, and STATUS.

Each data item that is associated with an entity object is given some form of unique identity within the control system. In a first embodiment of the invention, this identity is a string 'object_name.data_item_name', where object_name is a name that uniquely identifies an entity object, and data_item_name is a name that within the scope of this object uniquely identifies a data item. For example, the description of the flow control loop FIC201 would be identified by a string 'FIC201.DESCRIPTION', and its setpoint by 'FIC201.SETPOINT'. For each data item that is associated with an Entity Object, the Entity Object holds a reference, which identifies an access server that provides access to that data item.

Different data items that are associated with the same or different entity objects are accessible through different access servers, either because:

the data sources that include the data items are of different types, connected through different communication means, and thus require different types of OPC servers, very large numbers of data items are accessed by many different clients, so the load needs to be shared between several computers, access servers are redundant, i.e. an access server runs both in a first computer and in a second computer, the second computer being prepared to take over the tasks of the first computer in case the first computer fails.

In all these cases, the method described here allows the client application to use one uniform way to access all data items, relieving it from having to deal with what different types of access servers are involved, and how each access server is partitioned or duplicated.

Each Entity Object 10 holds information, in the form of the reference described above, about which access server to use for each data item that is associated with it. For a specific data source this reference may for example be provided to the relevant entity objects by the configuration tool that is used to configure the data source, or through means provided by the relevant access servers, such as the browsing mechanism provided by OPC servers, or from any other source.

According to the present invention, a client application's access to data items is managed by a software component called Access Service Handler 2. This component is preferably made available to the client application 1 in some form of component library, for example a DLL (Dynamic Link Library) or a shared library. It presents one uniform set of interfaces to the client application. Preferably, these interfaces comply with some well-known standard, such as OPC or SQL (Structured Query language). Through these interfaces the client application can access data items by referring to the data items' unique identifiers. The Access Service Handler generates access requests to the different underlying access servers, using information retrieved from the relevant entity objects to establish which access server to use for each data item.

Referring to FIG. 3 showing a Control System according to an embodiment of the invention including a Client Application 1, an Access Service Handler 2, and one or more Entity Objects 10. The method according to an embodiment of the invention is carried out in the following way. At run-time:

1. The client application 1 associates with the Access Service Handler 2 component, e.g. by instantiating it as an in-process COM object.
2. The client application 1 invokes relevant interfaces of the Access Service Handler 2, passing identifiers for the data items that it needs to access as parameters, for example 'FIC201.VALUE', 'FIC201.SETPOINT', 'TI114.VALUE', and 'TI114.HIGH ALARM LIMIT'.
3. For each data item included in the client application's access request, the Access Service Handler 2 queries the relevant entity object 10 for a reference to the access server 3 that provides access to the data item.
4. Based on this information the Access Service Handler 2 then splits the client application's request into separate requests 32 for the different access servers 3.

5. When the access servers 3 respond to these requests, the Access Service Handler 2 merges the different results to one response, which is sent back to the client application 1.

The client application 1 with the Access Service Handler 2, the entity objects 10, and all access servers 3, may run in the same computer, or in different computers connected through a network.

Figure 4:
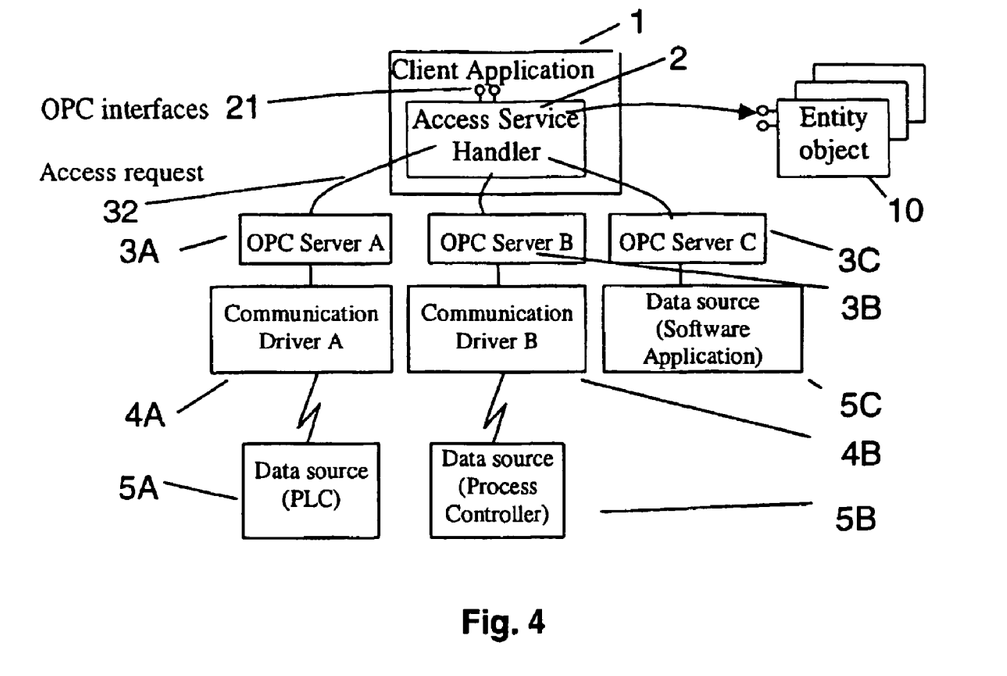
FIG. 4 shows a preferred embodiment of the invention, in which the Access Service Handler is a COM object with OPC compliant interfaces, and the access servers are OPC servers.

FIG. 4 shows an advantageous and preferred embodiment of the invention. In this embodiment, the Access Service Handler 2 is a COM object, and the interfaces, such as interface 21, it exposes to the client application are OPC compliant. Further, the access servers 3A, 3B, 3C are predominantly OPC servers. This embodiment is advantageous because OPC is a well-known specification, and OPC servers are commercially available for many different types of data sources, such as process controllers, programmable logic controllers (PLC), and intelligent field devices.

Figure 5:
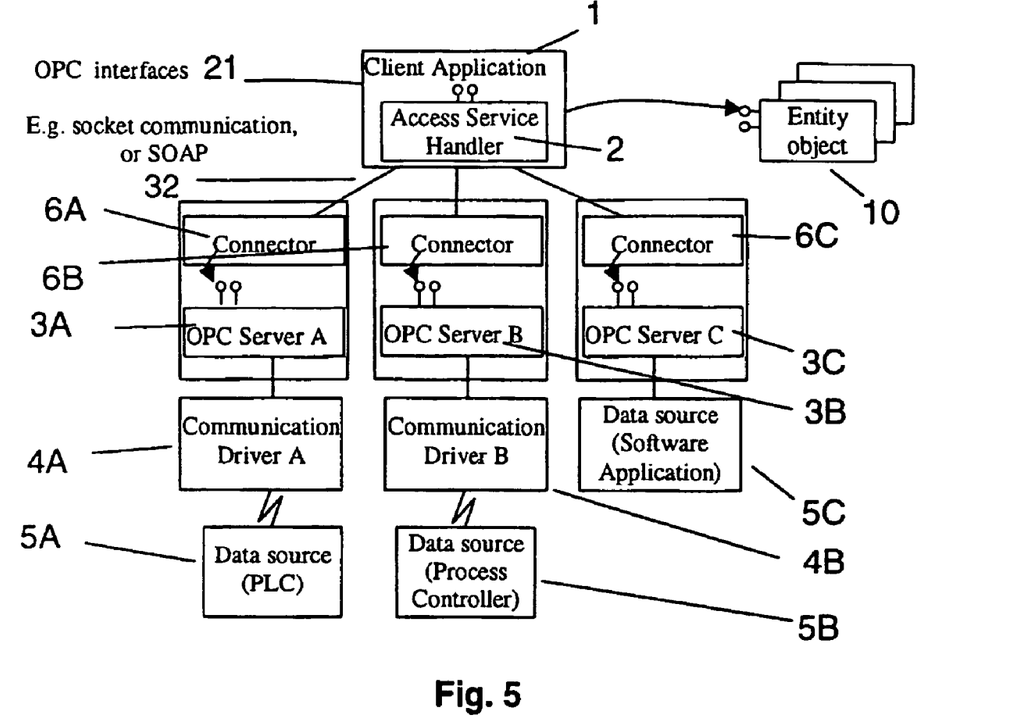
FIG. 5 shows a development of the preferred embodiment of FIG. 4, in which the communication between the Access Service Handler and each OPC server is managed via Connectors.

In its definition, OPC specifies that a remote client application communicate with an OPC server through DCOM (Distributed COM). In a development of the preferred embodiment of the invention, this communication is managed via a software component that functions as a kind of a proxy. This software proxy is called a Connector 6, which runs in the same computer as each respective OPC server, and interacts locally with the OPC server through COM.

See FIG. 5. FIG. 5 shows a Connector 6 running in the same computer as an OPC server (3A, 3B, 3C). Communication between the Access Service Handler 2 and, for example, the OPC server 3A is routed via the Connector 6A. This arrangement has a technical advantage in that it allows any suitable means to be used for remote communication between the Access Service handler 2 and the Connector 6A. Suitable means includes means such as socket communication over TCP/IP, as web services over SOAP, or any other communication means that is available or preferred in any particular case or circumstances. The Connector 6A interacts locally with the OPC server 3A through COM, in accordance with the OPC specification.

This may be compared with the prior art as shown in FIG. 2. In FIG. 2 it may be observed that the communication links between the OPC servers and the client application will, by definition according to OPC, conform to COM for a local process and to DCOM for a process running in a remote machine.

Figure 6:
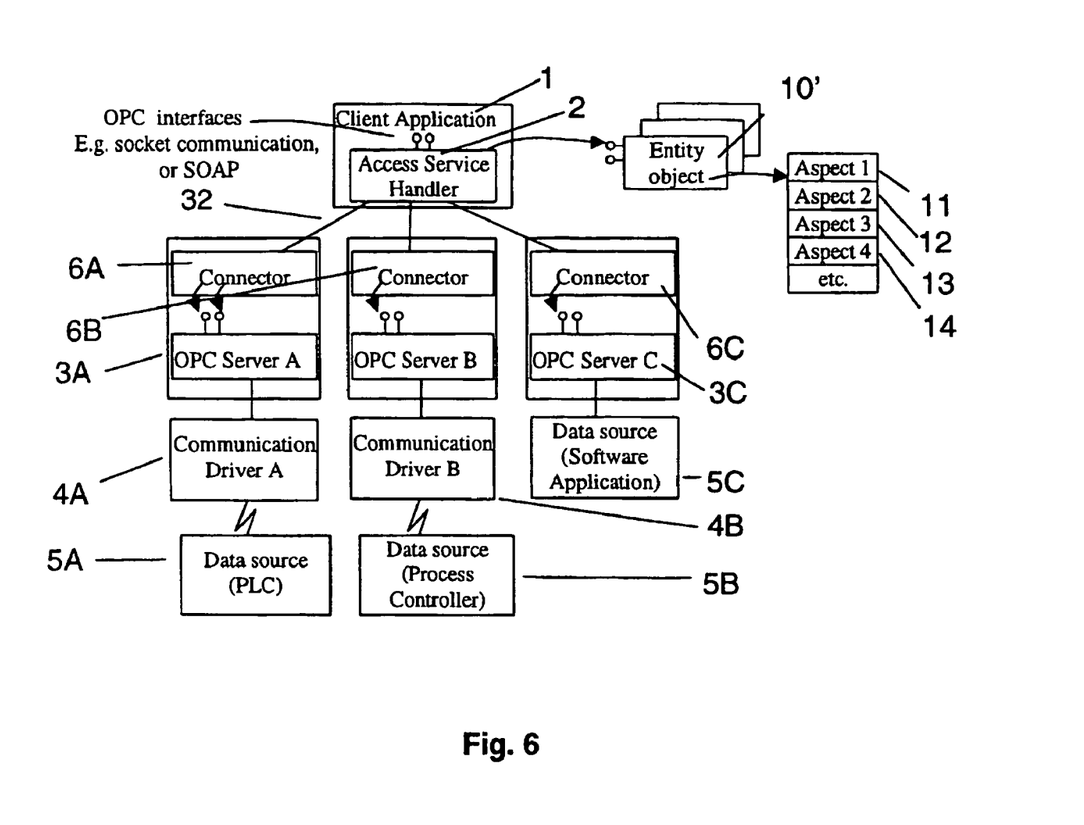
FIG. 6 shows a best use of the preferred embodiment of FIG. 5, a further development in which the entity objects are Composite Objects.

FIG. 6 shows a composite object 10' holding a number of aspects 11-14 etc. The Composite Object 10' replaces the Entity Object 10 of FIGS. 3-5. In this advantageous form, each entity object is a composite object 10' as defined in WO00102953, and information about each data item that is associated with a certain composite object is provided by an aspect 11-14 of that composite object. The Access Service Handler 2 obtains a reference to the interface of the implementation of the function, which is used to query for information about which access server to use for a specific data item, by querying the composite object 10', as described in WO00102953.

Figure 7:
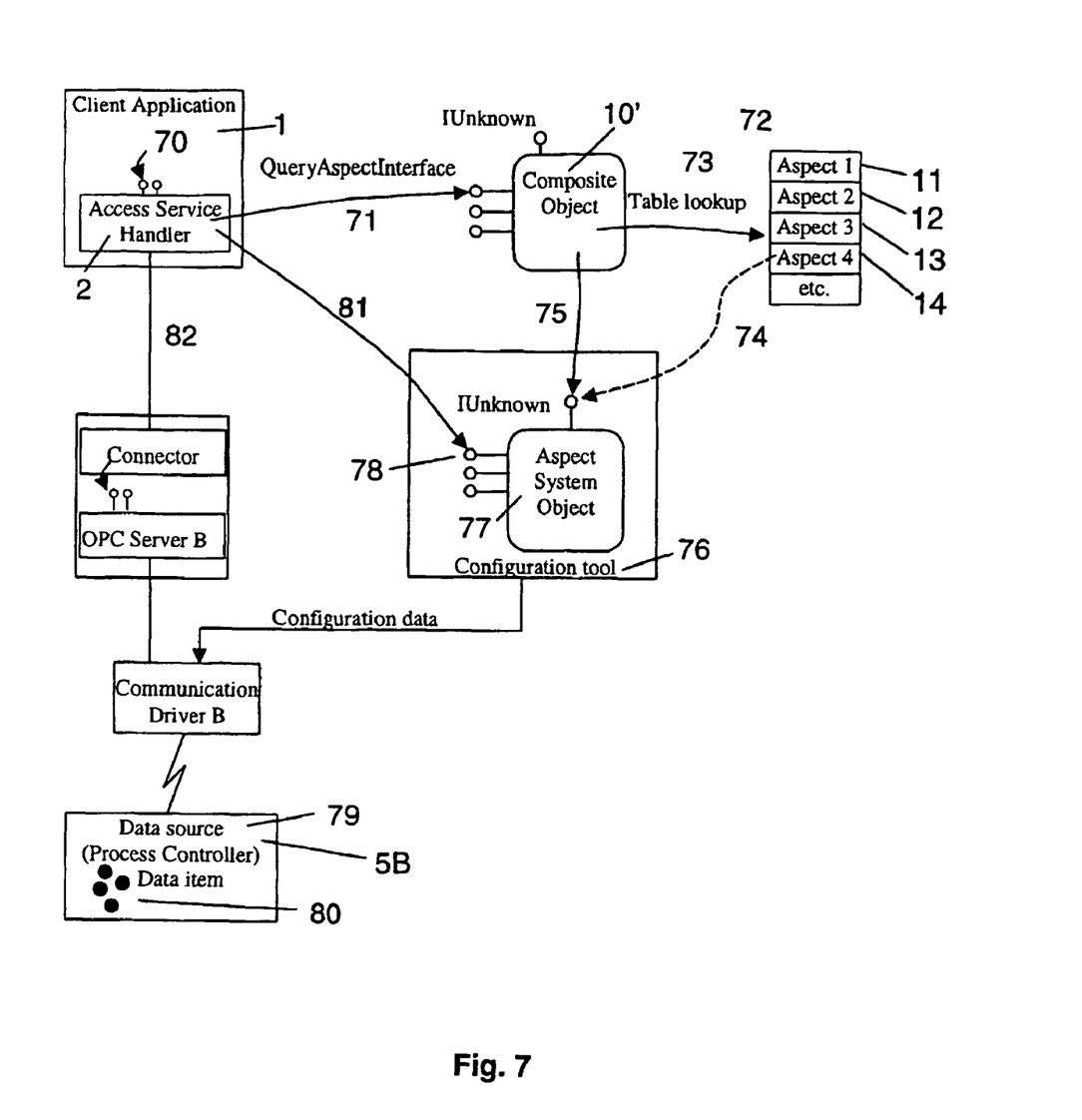
FIG. 7 shows best use of a preferred embodiment in which an aspect is implemented by a configuration tool for a controller device.

FIG. 7 shows a configuration tool 76 for a process controller 5B, which is one type of data source that may be accessed by a Client Application 1 via an Access Service Handler 2. In this best use of the invention the aspect 14 that provides information about a data item is implemented by a software application that is in some way related to the data source where the data item resides. For example, for data items that reside in controllers of a certain type or manufacture, this aspect 14 may be implemented by a software application that serves as the configuration tool 76 for that type of controller.

This is illustrated in FIG. 7. In this example, the client application 1 makes an access request by invoking 70 an interface of the Access Service Handler 2 with identifiers for one or more data items as parameters. For each data item, the Access Service Handler queries 71 the relevant Composite Object 10' for a reference to the access server that provides access to the data item 80. This function may be most suitably, but not exclusively, provided by an Aspect System Object as described in WO 00102953 cited above. Through table look-up 73 the Composite Object 10' finds a reference 74 to the relevant Aspect System Object 77, interrogates 75 this object for information about its interfaces, and returns a reference to the proper interface 78 of this object to the Access Service Handler 2. In this example, the Aspect System Object 77 is provided by the configuration tool 76 that is used to program the controller 5B that stores the data item 80. The Access Service Handler 2 invokes 81 this interface, getting as a response a reference to the access service to use for this data item, OPC Server B, 3B in this case. The Access Service handler can then make the access request 82.

Figure 8:
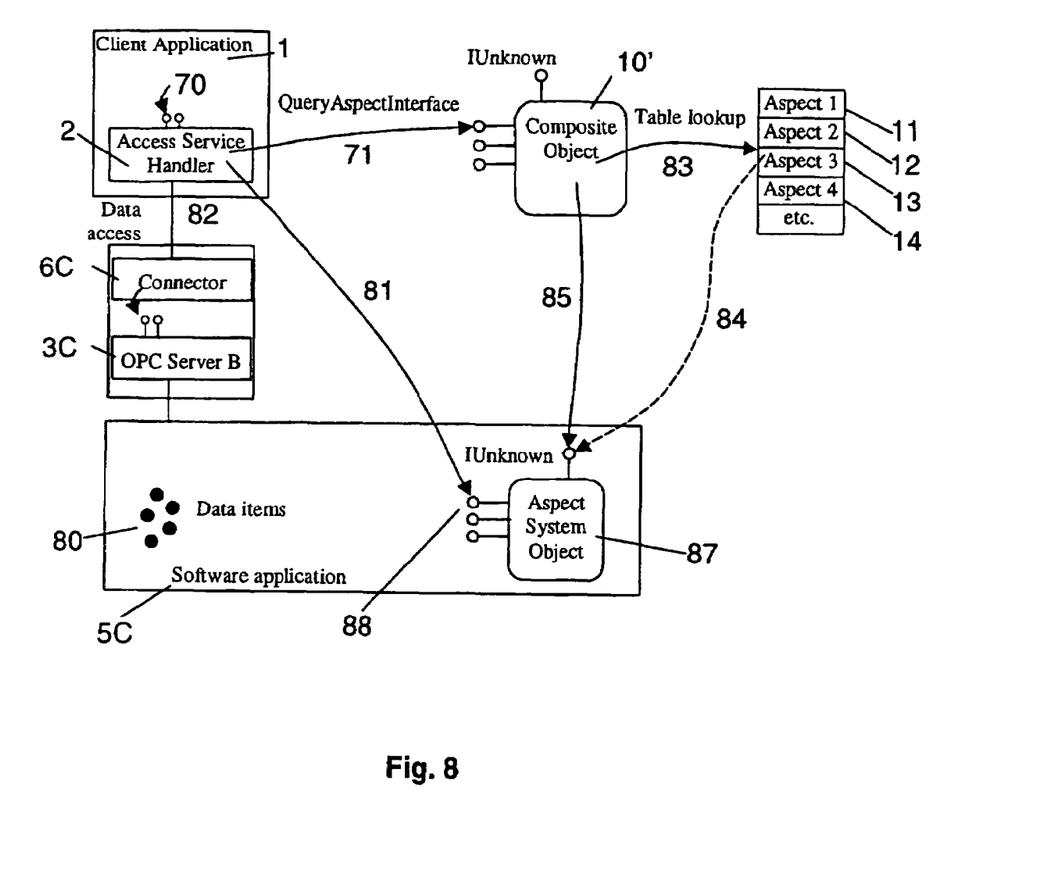
FIG. 8 shows a similar best use of a preferred embodiment in which an aspect is implemented by a software application that provides data items.

For data items where a software application is the source, the aspect that provides information about those data items would preferably be implemented by that software application itself. An example of this is illustrated in FIG. 8. FIG. 8 shows a software application 5C', data items 80 and an Aspect System Object 87. The Client Application 1 invokes 70 an interface of the Access Service Handler 2 with identifiers for one or more data items as parameters. For each data item, the Access Service Handler queries 71 the relevant Composite Object 10' for a reference to the access server that provides access to the data item 80. Through table look-up 83 the Composite Object 10' finds a reference 84 to the relevant Aspect System Object 87, interrogates 85 this object for information about its interfaces, and returns a reference to the proper interface 88 of this object to the Access Service Handler 2. The Access Service Handler 2 invokes 81 this interface, getting as a response a reference to the access service to use for this data item, which is shown as OPC Server C, 3C in this case. The Access Service handler can then make the access request 82.

The preferred embodiment shown in FIGS. 6, 7, 8 represents one or more best uses of the invention, because WO00102953 describes a method and system for integration of many and different independent software applications, and the present invention provides an inventive and efficient way of extending that method with a method and system for uniform and location transparent access to data items that are managed by many and different independent software applications and other data sources.

In carrying out the method of the invention different forms of communication, including wireless communication may be used. One or more of the communications may consist in part of a data communication signal. The data communication signal in part of a data transmission between a client application (1) and a computerised control system normally comprises an identifying part that identifies a given Object (10, 10') representing an entity controlled by said computerised control system and an data part dependent on a data item associated with said given Object. The data signal may be formatted according to a known format such as a format derived from SGML (Standard Generalised Markup Language) such as one compatible to an XML standard or WML or to a protocol such as WAP.

It is also noted that while the above describes exemplifying embodiments of the invention, there are several variations and modifications which may be made to the disclosed solution without departing from the scope of the present invention as defined in the appended claims. As an example, instead of OPC, some other well-known interface for access to real-time data, historical data, and alarm and event data, or any subset thereof, may be used.

A computer program product comprising the Access Service Handler and Connector software components and access servers according to the invention may be stored at least in part on different mediums that are computer readable. Archive copies may be stored on standard magnetic disks, hard drives, CD or DVD disks, or magnetic tape. The different parts of this computer program product may, for example at different times, be stored in any of; a volatile Random Access memory (RAM) of a computer or processor, a hard drive, an optical or magneto-optical drive, or in a type of non-volatile memory such as a ROM, PROM, or EPROM device. The computer program product may also be arranged in part as a distributed application capable of running on several different computers or computer systems at more or less the same time.

The invention claimed is:

1. A method for providing access to a data item in a computer based control system for industrial process or manufacturing control, said control system including client applications and a plurality of objects and at least two access servers, wherein said objects represent various entities that have a defined functional meaning in the control system and at least one object has at least one data item associated with it, and wherein each access server provides access to at least one real-time, historical, or alarm or event data item, the method comprising:
providing an Access Service Handler component;
associating the Access Service Handler component to a client application;
sending a request for access to a data item from the client application to the Access Service Handler;
identifying with the Access Service Handler an access server that provides access to said data item by querying an object to which said data item is associated for a reference associated with said data item;
sending an access request from the Access Service Handler to the identified access server;
receiving with the Access Service Handler a response from the identified access server, the response including one or more values dependent on the data item requested;
receiving with the client application from the Access Service Handler the response; and
supervising or controlling with the client application a function in the computer controlled process or manufacturing control system utilizing the one or more values.

2. The method according to claim 1, further comprising:
sending from the client application to the Access Service Handler a single access request for a plurality of data items, wherein at least two data items are accessible through different access servers;
splitting with the Access Service Handler said single request into two or more separate requests for different access servers and sending each separate request to the respective access server;
receiving with the Access Service Handler separate responses from the different access servers;
merging in the Access Service Handler the separate responses from the different access servers into one single response; and
receiving with the client application from the Access Service Handler the single response with one or more values dependent on the data items requested.

3. The method according to claim 1, wherein each data item is identified through a unique identifier.

4. The method according to claim 3, wherein the unique identifier comprises an identifier for an object with which the data item is associated and an identifier for the data item.

5. The method according to claim 3, wherein the client application passes the unique identifier as a parameter as part of an invocation of an interface of the Access Service Handler.

6. The method according to claim 5, wherein the Access Service Handler uses the unique identifier of each data item to identify an object with which the data item is associated.

7. The method according to claim 1, wherein the Access Service Handler is provided as a component library.

8. The method according to claim 1, wherein at least one of said one or more access servers comprises an OPC Server.

9. The method according to claim 1, wherein the Access Service Handler provides OPC compliant interfaces to the Client Application.

10. The method according to claim 1, wherein communication between the Access Service Handler and the access servers is routed by a proxy means for communication.

11. The method according to claim 10, wherein the proxy means comprises a web service.

12. The method according to claim 10, wherein the proxy means comprises a TCP/IP socket.

13. The method according to claim 1, further comprising:
providing at least one of the access servers in two or more instances running on two or more computers for load sharing, each instance responsible for a part of a scope of the access server.

14. The method according to claim 1, further comprising:
providing at least one access server in two or more instances running on two or more computers for redundancy, each instance being capable of assuming work of at least one other instance in case the other instance fails or becomes unavailable.

15. The method according to claim 1, wherein said objects in most instances comprise composite objects comprising one or more aspects, and a reference to a data item is in most instances held by an aspect.

16. The method according to claim 15, wherein at least one aspect holding said reference is provided by a program that is a data source.

17. The method according to claim 15, wherein at least one aspect holding said reference is provided by a program that is associated with a data source.

18. A computerized control system for process or manufacturing control, the control system comprising:
a computer program product comprising a computer readable medium, and computer program instructions recorded on the computer readable medium and executable by a processor for carrying out a method for implementing a computer controlled process or manufacturing control system, said control system including client applications and a plurality of objects and at least two access servers, wherein said objects represent various entities that have a defined functional meaning in the control system and at least one object has at least one data item associated with it, and wherein each access server provides access to at least one real-time, historical, or alarm or event data item, the method comprising:
providing an Access Service Handler component;
associating the Access Service Handler component to a client application;
sending a request for access to a data item from the client application to the Access Service Handler;
identifying with the Access Service Handler an access server that provides access to said data item by querying an object to which said data item is associated for a reference associated with said data item;

sending an access request from the Access Service Handler to the identified access server;

receiving with the Access Service Handler a response from the identified access server, the response including one or more values dependent on the data item requested;

receiving with the client application from the Access Service Handler the response; and supervising or controlling with the client application a function in the computer controlled process or manufacturing control system utilizing the one or more values.

19. The computerized control system according to claim 18, wherein the data communication signal between the Access Service Handler and at least one access server is formatted in part compatible to an XML standard.

20. The computerized control system according to claim 18, wherein the data communication signal between the Access Service Handler and at least one access server is formatted in part compatible to a standard that is a derivative of an SGML standard.

21. The computerized control system according to claim 20, wherein the derivative of the SGML standard comprises WAP or WML.

22. The computerized control system according to claim 18, wherein the data communication signal between the Access Service Handler and at least one access server is formatted in part compatible to a standard suitable for use with a portable computing device and/or telephone.

23. A computer program product, comprising:
a computer readable medium; and
computer program instructions recorded on the computer readable medium and executable by a processor for carrying out a method for implementing a computer controlled process or manufacturing control system, said control system including client applications and a plurality of objects and at least two access servers, wherein said objects represent various entities that have a defined functional meaning in the control system and at least one object has at least one data item associated with it, and wherein each access server provides access to at least one real-time, historical, or alarm or event data item, the method comprising:

providing an Access Service Handler component;

associating the Access Service Handler component to a client application;

sending a request for access to a data item from the client application to the Access Service Handler;

identifying with the Access Service Handler an access server that provides access to said data item by querying an object to which said data item is associated for a reference associated with said data item;

sending an access request from the Access Service Handler to the identified access server;

receiving with the Access Service Handler a response from the identified access server, the response including one or more values dependent on the data item requested;

receiving with the client application from the Access Service Handler the response; and supervising or controlling with the client application a function in the computer controlled process or manufacturing control system utilizing the one or more values.

24. A method for providing access to data items in a computer based control system for industrial process or manufacturing control, said control system including client applications and a plurality of objects and at least two access servers, wherein said objects represent various entities that have a defined functional meaning in the control system and at least one object has at least one data item associated with it, and wherein each access server provides access to a least one real-time, historical, or alarm or event data item, the method comprising:

providing an Access Service Handler component;

associating the Access Service Handler component to a client application;

sending from the client application to the Access Service Handler a single access request for a plurality of data items, wherein at least two data items are accessible through different access servers;

splitting with the Access Service Handler said single request into two or more separate requests for different access servers and for sending each separate request to the respective access server;

identifying with the Access Service Handler the access servers that provide access to said data items by querying the objects to which said data items associated;

sending each separate access request from the Access Service Handlers to the respective identified access server;

receiving with the Access Service Handler separate responses from the different access servers, the responses including one or more values dependent on the data items requested;

merging in the Access Service Handler the separate response from the different access servers into one single response;

receiving with the client application from the Access Service Handler the single response including one or more values dependent on the data items requested; and supervising or controlling with the client application a function in the computer controlled process or manufacturing control system utilizing the one or more values.

* * * * *